2,874,036

AMMONIATED SUPERPHOSPHATES AND PROCESS OF PRODUCING SAME

Richard C. Datin, Petersburg, Va., assignor to Allied Chemical Corporation, a corporation of New York No Drawing. Application September 11, 1953
Serial No. 379,728

19 Claims. (Cl. 71—43)

This invention relates to the production of fertilizers, and more particularly to the production of ammoniated superphosphates.

Two procedures are now commonly used for producing ammoniated superphosphates, and this invention may be employed in connection with both to reduce the tendency for reversion to take place of citrate-soluble $P_2O_5$, in which form it is available as plant food, to a citrate-insoluble form, i. e., the forms of $P_2O_5$ unavailable as plant food and insoluble in ammonium citrate solutions as determined by the procedure of analysis of the Association of Official Agricultural Chemists (Methods of Analysis, 7th ed., Washington, 1950).

In one procedure, herein referred to as the superphosphate procedure, only a small excess of acid, usually sulfuric acid, is used to acidulate the phosphate rock to form solid superphosphate which is ammoniated after curing. By "excess acid" in this specification is meant the amount of acid over and above the amount required to solubilize the $P_2O_5$ in the rock. In this procedure in lieu of sulfuric acid, mixed acids may be used, such as mixtures of sulfuric and nitric acids, sulfuric and phosphoric acids, or nitric and phosphoric acids. In general, in this procedure at least 3 and usually about 5 equivalents of acid per mol of $P_2O_5$ are employed to effect the acidulation. By an "equivalent of acid" is meant the quantity of acid which contains one formula weight of hydrogen ion, i. e., a half mol of $H_2SO_4$, one mol of $HNO_3$ and one mol of $H_3PO_4$. For purposes of determining the "equivalents of acid," in the processes embodying this invention, phosphoric acid is considered a monobasic acid, because mono-calcium phosphate or $CAH_4(PO_4)_2$ comprises the major portion of the phosphoric acid in superphosphates, i. e., two hydrogen ions remain with the phosphoric acid.

In the other procedure, which will be hereinafter referred to as the "slurry procedure," the phosphate rock is treated with a considerable excess of acid forming a slurry which is ammoniated immediately after its formation and the ammoniated superphosphate is then dried and granulated, if desired. Best results are usually obtained by acidulating the phosphate rock with a mixed acid having nitric acid as the main ingredient. However, it is usually necessary to supply sulfate ion, as sulfuric acid or a water-soluble sulfate, in sufficient quantity to combine with all calcium in the rock, over and above the calcium required to form dicalcium phosphate ($CaHPO_4$) with the $P_2O_5$ in the rock. Instead of sulfuric acid, phosphoric acid may be used for this purpose, but is somewhat less effective. If enough sulfuric or phosphoric acid is not used to combine with all of the calcium over and above that required to form dicalcium phosphate with the $P_2O_5$ in the rock, excessive reversion is likely to occur during ammoniation. It is not unusual in the latter event, for 30% or more of the $P_2O_5$ content of the phosphate rock to become citrate-insoluble. Such reversion takes place in the dried product, even before it is stored. Even though it may be desirable to acidulate the rock employing nitric acid alone, because of the non-availability of sulfuric or phosphoric acid, or for reasons of economy or for other reasons, to the best of my knowledge and belief, it has not been possible to do so prior to my invention without causing excessive reversion of $P_2O_5$ to take place during the ammoniation step of the slurry procedure.

The amount of acid used in the slurry procedure may be from 6 to 20, preferably from 6 to 15, equivalents of acid per mol of $P_2O_5$ in the phosphate rock. In the slurry procedure, it is that portion of the ammonia over and above that which is required to neutralize the excess acid, that is responsible for reversion of citrate-soluble phosphates to a citrate-insoluble form and which action is inhibited by the present invention.

As above noted, in the slurry procedure from 6 to 20, preferably from 6 to 15, equivalents of acid per mol of $P_2O_5$ in the phosphate rock are used in the acidulation step. In the superphosphate procedure, at least 3 and usually about 5 equivalents of acid are employed per mol of $P_2O_5$. Hence, in the acidulation step of this invention considered generically, i. e., as including both procedures, the phosphate rock may be treated with from 3 to 20, desirably 3 to 15, equivalents of acid per mol of $P_2O_5$ in the phosphate rock.

In the ammoniation of superphosphates it has been the usual practice to employ about 1.3 mols of ammonia or less per mol of $P_2O_5$ to convert a part of the water-soluble mono-calcium acid phosphate to citrate-soluble phosphates. Use of larger amounts of ammonia to introduce additional nitrogen, conveniently and inexpensively supplied by ammonia, results in reversion of water-soluble and citrate-soluble phosphates to a citrate-insoluble form. It has been found that the amount of $P_2O_5$ reversion to the citrate-insoluble form tends to increase with an increase in the quantity of ammonia added to the superphosphates.

While the causes for reversion to citrate-insoluble $P_2O_5$ are not known, it is believed by many researchers in this field that it is due to reaction of tricalcium phosphate and calcium fluoride present in highly ammoniated superphosphate to form fluorapatite ($3Ca_3(PO_4)CaF_2$). Phosphate rocks generally used in making ammoniated superphosphate contain from 2% to 4.5% of fluorine which is ample to cause reversion.

It is among the objects of this invention to provide ammoniated superphosphates containing citrate-soluble $P_2O_5$ which has little or substantially no tendency to revert to the citrate-insoluble form and this notwithstanding that substantially in excess of 1.3 mols of ammonia are employed per mol of $P_2O_5$ in the ammoniation of the superphosphate.

It is another object of this invention to provide a slurry procedure of producing fertilizers in which, even though nitric acid alone is used as the acidulating medium, there is substantially less tendency for reversion to take place during ammoniation than in heretofore known slurry procedures.

Other objects and advantages of this invention will be apparent from the following detailed description thereof.

In accordance with this invention water-soluble magnesium salt sufficient to provide from 0.5% to 5%, preferably 1% to 4%, of magnesium by weight based on the weight of solids in the superphosphate is added prior to or during the ammoniation treatment. The water-soluble magnesium salt may be mixed with the phosphate rock prior to acidulation thereof, or may be added to the superphosphate prior to or during the ammoniation thereof. When the water-soluble magnesium salt is added directly to the phosphate rock the amount of magnesium salt employed should be sufficient to provide from 1% to 10% of magnesium by weight based on the weight of the phosphate rock. The magnesium salt may be added as such or by the addition of a magnesium compound, e. g., magnesium oxide which reacts with the acid present to form a water-soluble magnesium salt. When added to the phosphate rock before acidulation with nitric acid in the slurry procedure, the magnesium compounds decrease reversion of $P_2O_5$ during the subsequent ammoniation treatment. The expression "addition" or "introduction" is used herein in a broad sense and is intended to include the formation in situ of the water-soluble magnesium salts as well as their addition as such.

Surprisingly, it has been found that the addition of the water-soluble magnesium salt, as hereinabove described, permits the use of a much greater amount of ammonia than 1.3 mols of ammonia per mol of $P_2O_5$, for example, 1.6 mols of ammonia per mol of $P_2O_5$ and even more during the ammoniation with the production of ammoniated superphosphate in which there is materially less tendency for reversion of citrate-soluble $P_2O_5$ to the citrate-insoluble form to take place.

One possible explanation for the surprising improvement obtained by the addition of a water-soluble magnesium salt is that the added magnesium salt minimizes the formation of fluorapatite and/or results in the formation of a presently unknown complex $P_2O_5$ compound containing magnesium having a relatively high solubility in ammonium citrate solution, and, hence, high $P_2O_5$ availability as a plant nutrient. It will be understood that the above explanation is advanced in the interests of facilitating a better understanding of the invention, and that this invention is not to be limited thereby.

As the added water-soluble magnesium salt, magnesium nitrate and magnesium sulfate are preferred. The magnesium nitrate is employed in amout of from 3% to 31% by weight based on the weight of solids in the superphosphate; the magnesium sulfate is employed in amount of from 2.5% to 25% by weight based on the weight of solids in the superphosphate. When these salts are added directly to the phosphate rock the amount employed may be from 6% to 62% by weight of magnesium nitrate based on the weight of the phosphate rock and from 5% to 50% of magnesium sulfate based on the weight of the phosphate rock. All percentages hereinabove given are calculated on the basis of anhydrous salt.

Other magnesium salts soluble in water, such, for example, as magnesium chloride or potassium magnesium sulfate may be used. As above noted, the water-soluble magnesium salt need not be added as such, but may be formed in situ by reaction of a magnesium compound with nitric or sulfuric acid. Thus, for example, optimum results are obtained in the slurry procedure by adding magnesium oxide plus an amount of nitric acid sufficient to react with the oxide to form magnesium nitrate; the nitric acid thus used is in addition to the nitric acid used for dissolving the phosphate rock.

The rock and acid are desirably introduced at room temperature. The acidulation is an exothermic reaction and may be carried out at any desired temperature below that at which substantial loss of nitrogen compound takes place. The acidulation may be carried out without external cooling. By introducing the rock and acid at atmospheric temperature, the reaction mixture in general will not go above about 85° to 100° C. Preferably, the reaction mixture is left at this temperature until the acidulation reaction has been completed. The acidulation reaction is carried out in the presence of from about 15% to about 45% water based on the total weight of the constituents present in the acidulator.

The acidulated mixture, referred to hereinafter as superphosphate, is ammoniated employing from about 1.6 to 2.9 mols of ammonia per mol of $P_2O_5$ in the superphosphate. This range refers to the range of amounts of ammonia employed in the ammoniation over and above the amount of ammonia added to neutralize the excess acid. Thus, in the superphosphate procedure involving the use of about 5 equivalents of acid per mol of $P_2O_5$ (which amount represents little, if any, excess acid) from about 1.6 to 2.9 mols of ammonia per mol of $P_2O_5$ in the superphosphate is employed in ammoniation. In the slurry procedure the amount of ammonia used is greater by an amount equal to that required to neutralize the excess acid. The use of 1.6 mols of ammonia per mol of $P_2O_5$ (over and above the amount required to neutralize the excess acid) represents an increase of about 23% over and above the amount of ammonia heretofore used and which was generally considered the maximum permissible in order to avoid excessive reversion of $P_2O_5$ to the citrate-insoluble form.

The ammoniation is carried out in the presence of water; usually water in amount of from 7% to 10% of the ammoniated mixture will be found adequate, although larger amounts of water, as high as 50%, may be present, for example, when using 42% nitric acid or weaker acid to effect the acidulation. The ammoniated superphosphate leaving the ammoniator generally contains less water than the superphosphate ammonia reaction mixture. The temperature at which the ammoniation is carried out is not critical, usually the temperature is below the boiling point of the mixture subjected to ammoniation.

Aqueous ammonia solutions or gaseous ammonia may be employed to effect the ammoniation. Also solutions of salts having fertilizer value, for example, ammonia solutions of ammonium nitrate, or of sodium nitrate, and such solutions containing urea may be employed to effect the ammoniation.

The ammoniated superphosphate mixture may be subjected to a drying or granulation, or both, to produce the desired product. This invention includes processes in which phosphate rock is acidulated, the resultant superphosphate is ammoniated in the presence of a water-soluble magnesium salt added as such, or produced in situ at any stage of the process prior to or during the ammoniation, and the ammoniated superphosphate is used without further treatment, or is subjected to a drying or granulation treatment or is admixed with a potassium salt or other plant nutrient with or without additional treatment, such as drying or granulation or both of the resulting mixture.

The following examples are given for purposes of illustrating the invention; it will be understood the invention is not limited to these examples. In these examples all parts are by weight.

EXAMPLE I

A mixture containing 1000 parts of superphosphate, 432 parts of magnesium nitrate and 10 parts of water was ammoniated by adding to this mixture a solution consisting of 65% by weight of ammonium nitrate, 21.7% ammonia and 13.3% water. The superphosphate employed in this example and in Example II was a commercially produced superphosphate manufactured by treating phosphate rock with sulfuric acid. It contained approximately 19.5% of available $P_2O_5$. The amount of solution used in the ammoniation was approximately 0.22 pound per pound of superphosphate, corresponding to 5 pounds of free ammonia per unit (20 pounds) of $P_2O_5$, or 2.08 mols of free ammonia per mol of $P_2O_5$. The ammoniation was carried out at room temperature and required about 0.5 minute for applying the solution, followed by an additional 5 minute mixing. The ammoniated superphosphate thus produced is referred to hereinafter as Batch 1.

For purposes of comparison a second batch, hereinafter referred to as Batch 2, was prepared in the same manner, except that no magnesium compound was used and 223 parts of sand were mixed with the 1000 parts of superphosphate subjected to ammoniation.

Both batches were stored for 30 days at 50° C. They were then removed and analyzed to determine their total $P_2O_5$ and citrate-insoluble $P_2O_5$. These analyses, as well as all analyses hereinafter referred to, were carried out by regular Association of Official Agricultural Chemists procedures. The results were as follows:

Only 3.5% of the total $P_2O_5$ in Batch 1 was citrate-insoluble, whereas 8.1% of the total $P_2O_5$ in Batch 2 was citrate-insoluble.

EXAMPLE II

A mixture consisting of 1328 parts superphosphate, 15 parts sand filler, 113 parts water and 200 parts magnesium sulfate were ammoniated with a solution consisting of 65% by weight of ammonium nitrate, 21.7% ammonia and 13.3% water. 354 parts of this solution were used. Thus, about 5.4 pounds of free ammonia were employed per unit of $P_2O_5$ corresponding to 2.25 mols of free ammonia per mol of $P_2O_5$.

For purposes of comparison a second batch was prepared in the same manner, except that no magnesium sulfate was used and 215 parts of sand were mixed with the 1328 parts of superphosphate subjected to ammoniation. Thus, both batches produced contained the same amount by weight, namely, 2010 parts.

Samples of both batches were stored for 30 days at 80° C. and thereafter analyzed to determine their total $P_2O_5$ and citrate-insoluble $P_2O_5$. The results are given in the table which follows:

Table 1

|  | Batch containing magnesium sulfate | Batch containing no magnesium sulfate |
| --- | --- | --- |
| Percentage of total $P_2O_5$ citrate-insoluble before storage | 5.03 | 5.11 |
| Percentage of total $P_2O_5$ citrate-insoluble after storage | 8.17 | 18.20 |
| Percentage increase of citrate-insoluble $P_2O_5$ during storage | 3.14 | 13.09 |

EXAMPLE III

In this example 33 parts of magnesium oxide were first dissolved in 860 parts nitric acid of 48.7% concentration. (The magnesium oxide was equivalent to 100 parts 100% nitric acid.) Then, 308 parts of phosphate rock containing 106 parts of $P_2O_5$ were added to the resultant solution. Before ammoniation 520 parts of water were added. The ammonia was supplied as a gas at the rate of about 1 part per minute and 78 parts of ammonia were thus introduced corresponding to 6.12 mols total ammonia per mole of $P_2O_5$ or 4.55 mols of ammonia per mol of $P_2O_5$ allowing for ammonia required to neutralize the excess acid. The mixture was over ammoniated so that the pH of the slurry after ammoniation was 7.9. After ammoniation 175 parts of potassium chloride were added and the resultant mixture dried.

For purposes of comparison a second batch was prepared in substantially the same manner, except for the omission of the magnesium compound and the portion of the nitric acid employed for reaction with the magnesium oxide to produce magnesium nitrate; also 131 parts of sand filler were added to the mixture.

Samples of both products were analyzed after standing for 7 days or less at room temperature. The product produced in accordance with this invention involving the formation of magnesium nitrate in situ which was present during the ammoniation contained only 0.66% of the total $P_2O_5$ as citrate-insoluble. In the comparative batch containing no added magnesium compound, 29% of the total $P_2O_5$ was citrate-insoluble.

EXAMPLE IV

In this example 33 parts of magnesium oxide were first dissolved in 860 parts nitric acid of 48.7% concentration (the magnesium oxide was equivalent to 100 parts of 100% $HNO_3$). Then 308 parts of phosphate rock containing 106 parts $P_2O_5$ were dissolved in the resultant solution. Additional water was added before ammoniation. The ammonia was supplied as a gas at the rate of about 1 part per minute. 48 parts of ammonia were thus introduced, corresponding to 3.78 mols of ammonia per mol of $P_2O_5$. (This corresponds to 2.20 mols of ammonia per mol of $P_2O_5$, allowing for the ammonia required to neutralize the excess.) The pH of the slurry after ammoniation was 6.0. After ammoniation 175 parts of potassium chloride were added, and the resultant mixture dried.

For purposes of comparison, a second batch was prepared in substantially the same manner, except for the ommission of the magnesium compound and the nitric acid employed for reaction with the magnesium oxide to produce magnesium nitrate Samples of both products after standing for 7 days or less at room temperature were analyzed. The product produced in accordance with this invention involving the formation of magnesium nitrate in situ which was present during the ammoniation contained only 0.47% of the total $P_2O_5$ as citrate-insoluble. In the comparative batch containing no added magnesium compound, 22.5% of the total $P_2O_5$ was citrate-insoluble.

EXAMPLE V

First, 115.5 parts of pulverized potassium magnesium sulfate containing 13.2 parts of magnesium were dissolved in a mixture of 768 parts of 42% nitric acid and 22.4 parts of 85% phosphoric acid.

Then, 320 parts of phosphate rock containing 111.5 parts of $P_2O_5$ were treated with the acid solution at 50°–71° C. Next, 500 parts of water were added. Ammonia was then introduced as gas at the rate of 1 part per minute. A total of 66 parts of ammonia were supplied to give a pH of 6.2 in the slurry; the maximum temperature was 60° C. A total of 4.40 mols of ammonia were supplied per mol of $P_2O_5$, or 2.93 mols of ammonia per mol of $P_2O_5$, allowing for ammonia required to neutralize excess acid. During the ammoniation an additional 400 parts of water were added in order to keep the mixture sufficiently fluid. Finally 161 parts of potassium chloride were added, and the product was dried and analyzed.

For purposes of comparison, a second batch was prepared in substantially the same manner, except that the 115.5 parts of potassium magnesium sulfate were replaced with 47 parts of potassium sulfate and 71.9 parts of ammonium sulfate. The mixture contained approximately as many mols of sulfate as the potassium magnesium sulfate, but magnesium was lacking. In this case, 67 parts of ammonia were added, yet the final pH of the slurry was only 3.2.

The product produced with the use of potassium magnesium sulfate contained only 0.82% of its total $P_2O_5$ as citrate-insoluble; the product made with the substitute mixture of sulfates, without magnesium contained 4.51% of its total $P_2O_5$ as citrate-insoluble. In this example, a large concentration of sulfate was present, so that only a moderate amount of reversion occurred, even in the absence of magnesium.

It will be noted this invention provides a process of producing ammoniated superphosphates containing citrate-soluble $P_2O_5$ which has substantially less tendency to revert to the citrate-insoluble form, and this notwithstanding substantially in excess of 1.3 mols of ammonia are employed per mol of $P_2O_5$ in the ammoniation of the superphosphate. Furthermore, this invention enables the use of nitric acid alone as the acidulating medium in a slurry process of producing ammoniated superphosphates with reduction in reversion during ammoniation and the production of an ammoniated superphosphate having substantially less tendency to revert to the citrate-insoluble form than ammoniated superphosphates heretofore produced by such slurry procedure employing nitric acid alone as the acidulating medium.

It will be further noted that an important feature of this invention is that the magnesium salt introduced during the processing of the fertilizer is water-soluble when added. At least a part of the originally soluble magnesium salt may be converted to an insoluble compound during the processing of the fertilizer, but, as above noted, in order to obtain the improvement in minimizing reversion of citrate-soluble $P_2O_5$ to citrate-insoluble $P_2O_5$, the magnesium compound introduced must initially be water-soluble. Water-insoluble magnesium compounds, such as dolomite, do not give this improvement, neither does the addition of calcium salts, as disclosed, for example, in Patent 2,022,675 of December 3, 1935.

Since certain changes may be made in carrying out the above process without departing from the scope of the invention, it is intended that all matter contained in the above description shall be interpreted as illustrative and not in a limiting sense.

What is claimed is:

1. The process of minimizing reversion of citrate-soluble $P_2O_5$ to citrate-insoluble $P_2O_5$ in ammoniated superphosphates, which process comprises acidulating phosphate rock containing fluorine with from 3 to 20 equivalents of acid per mol of $P_2O_5$ in the phosphate rock, ammoniating the superphosphate thus produced employing from about 1.3 to about 2.9 mols of ammonia per mol of $P_2O_5$ over and above the amount of ammonia required to neutralize that portion of the acid employed during the acidulation which is in excess over that required to solubilize the $P_2O_5$ in the phosphate rock, and adding a water-soluble magnesium salt to the process in amount sufficient to provide from 0.5% to 5% magnesium by weight based on the weight of solids in the superphosphate, the said magnesium salt being added to the process so that it is present during the ammoniation.

2. The process defined in claim 1, in which the water-soluble magnesium salt is added to the superphosphate just prior to subjecting the superphosphate to ammoniation.

3. The process defined in claim 1, in which from 2.5% to 25% by weight of magnesium sulfate (calculated as the anhydrous salt) based on the weight of solids in the superphosphate is present during the ammoniation.

4. The process defined in claim 1, in which from 3.0% to 31% by weight of magnesium nitrate (calculated as the anhydrous salt) based on the weight of solids in the superphosphate is present during the ammoniation.

5. A process of minimizing reversion of citrate-soluble $P_2O_5$ to citrate-insoluble $P_2O_5$ in the production of ammoniated superphosphate, which comprises acidulating phosphate rock containing from 2% to 4.5% by weight of fluorine employing from 3 to 20 equivalents of acid per mol of $P_2O_5$ in the phosphate rock, ammoniating the superphosphate thus produced employing at least 1.6 mols of ammonia per mol of $P_2O_5$ over and above the amount of ammonia required to neutralize that portion of the acid employed during the acidulation which is in excess over that required to solubilize the $P_2O_5$ in the phosphate rock and introducing a water-soluble magnesium salt in the superphophate subjected to ammoniation so that it is present during the ammoniation.

6. The process defined in claim 5, in which the amount of water-soluble magnesium salt introduced is sufficient to provide from 0.5% to 5% magnesium by weight based on the weight of solids in the superphosphate.

7. The process defined in claim 5, in which from 2.5% to 25% by weight of magnesium sulfate based on the weight of solids in the superphosphate is introduced.

8. The process defined in claim 5, in which from 3.0% to 31% by weight of magnesium nitrate based on the weight of solids in the superphosphate is introduced.

9. The process of producing ammoniated superphosphate as defined in claim 5, in which the magnesium salt is introduced into the process so that it is present during the acidulation of the phosphate rock.

10. A process of minimizing reversion of citrate-soluble $P_2O_5$ to citrate-insoluble $P_2O_5$ in the production of ammoniated superphosphate, which comprises acidulating phosphate rock containing from 2% to 4.5% by weight of fluorine employing from about 3 to about 5 equivalents of acid per mol of $P_2O_5$ in the phosphate rock, ammoniating the superphosphate thus produced employing from about 1.6 to about 2.9 mols of ammonia per mol of $P_2O_5$ in the superphosphate over and above the amount of ammonia required to neutralize that portion of the acid employed during the acidulation which is in excess over that required to solubilize the $P_2O_5$ in the phosphate rock and introducing a water-soluble magnesium salt from the group consisting of magnesium sulfate and magnesium nitrate into the superphosphate subjected to ammoniation so that it is present during the ammoniation.

11. A process of minimizing reversion of citrate-soluble $P_2O_5$ to citrate-insoluble $P_2O_5$ in the production of ammoniated superphosphate, which comprises treating phosphate rock containing fluorine with a solution of magnesium nitrate in nitric acid employing from 3 to 20 equivalents of acid per mol of $P_2O_5$ in the phosphate rock and ammoniating the resultant mixture employing from about 1.6 to about 2.9 mols of ammonia per mol of $P_2O_5$ in the superphosphate over and above the amount of ammonia required to neutralize that portion of the nitric acid which is in excess over that required to solubilize the $P_2O_5$.

12. The process defined in claim 11, in which from 6% to 62% by weight of magnesium nitrate (calculated as the anhydrous salt) based on the weight of the phosphate rock is added to the rock.

13. A process of minimizing reversion of citrate-soluble $P_2O_5$ to citrate-insoluble $P_2O_5$ in the production of ammoniated superphosphate, which comprises treating phosphate rock containing from 2% to 4.5% by weight of fluorine with from 2 to 20 equivalents of acid containing predominantly nitric acid, ammoniating the resultant slurry using from about 1.6 to 2.9 mols of ammonia per mol of $P_2O_5$ in the slurry over and above the amount of ammonia required to neutralize the acid in excess of the amount of acid required to solubilize the $P_2O_5$ in the phosphate rock, drying the resultant slurry and introducing into said slurry before the said ammoniation is complete a water-soluble magnesium salt in amount sufficient to minimize reversion of citrate-soluble $P_2O_5$ to citrate-insoluble $P_2O_5$.

14. The process of producing ammoniated superphosphate defined in claim 13, in which the water-soluble magnesium salt is from the group consisting of magnesium sulfate and magnesium nitrate and is introduced in admixture with the phosphate rock in amount sufficient to contain from 1% to 10% of magnesium based on the weight of the rock.

15. A process of minimizing reversion of citrate-soluble $P_2O_5$ to citrate-insoluble $P_2O_5$ in the production of ammoniated superphosphate, which comprises treating phosphate rock containing from 2% to 4.5% by weight of fluorine with an acid solution of potassium magnesium sulfate and ammoniating the resultant mixture employing from about 1.6 to about 2.9 mols of ammonia per mol of $P_2O_5$ in the superphosphate, the amount of potassium magnesium sulfate added being sufficient to provide from 0.5% to 5% magnesium by weight based on the weight of the solids in the mixture resulting from the treatment of the phosphate rock with the acid solution of potassium magnesium sulfate.

16. In a process of minimizing reversion of citrate-soluble $P_2O_5$ to citrate-insoluble $P_2O_5$ in ammoniated superphosphates produced by acidulating phosphate rock containing fluorine and ammoniating the resultant superphosphate employing at least 1.6 mols of ammonia per mol of $P_2O_5$ in the superphosphate, the improvement which comprises introducing a water-soluble magnesium salt in amount sufficient to minimize reversion of citrate-soluble $P_2O_5$ to citrate-insoluble $P_2O_5$, said water-soluble magnesium salt being present during the ammoniation of the superphosphate.

17. The process defined in claim 5, in which the acid used to effect the acidulation is a mixture of nitric and sulfuric acids.

18. An ammoniated superphosphate containing at least 1.6 mols of ammonium ions per mol of $P_2O_5$ and sufficient water-soluble magnesium salt to minimize reversion of citrate-soluble $P_2O_5$ to citrate-insoluble $P_2O_5$, said ammoniated superphosphate being produced by acidulating phosphate rock containing fluorine and ammoniating the acidulated material using at least 1.6 mols of ammonia per mol of $P_2O_5$ in the superphosphate in the presence of said water-soluble magnesium salt.

19. An ammoniated superphosphate containing at least 1.6 mols of ammonium ions per mol of $P_2O_5$ and from 0.5% to 5% magnesium by weight based on the weight of solids in the superphosphate, said magnesium being present in the form of a water-soluble magnesium salt from the group consisting of magnesium nitrate, magnesium sulphate, magnesium chloride and potassium magnesium sulphate, said ammoniated superphosphate being produced by acidulating phosphate rock containing fluorine and ammoniating the acidulated material, using at least 1.6 mols of ammonia per mol of $P_2O_5$ in the superphosphate in the presence of said water-soluble magnesium salt.

References Cited in the file of this patent

UNITED STATES PATENTS

| | | |
|---|---|---|
| 252,029 | Gibbons et al. | Jan. 10, 1882 |
| 1,849,989 | Moore | Mar. 15, 1932 |
| 1,948,520 | Harvey | Feb. 27, 1934 |
| 1,953,419 | MacIntire | Apr. 3, 1934 |
| 2,053,432 | Harvey | Sept. 8, 1936 |
| 2,739,054 | Andres et al. | Mar. 20, 1956 |

FOREIGN PATENTS

| | | |
|---|---|---|
| 2,568 | Great Britain | July 22, 1874 |